(12) United States Patent
Carpenter et al.

(10) Patent No.: US 9,759,594 B2
(45) Date of Patent: Sep. 12, 2017

(54) CONTAINER AND OVERCAP WITH HINGED SPOUT FOR METERED DISPENSING

(71) Applicant: SONOCO DEVELOPMENT, INC., Hartsville, SC (US)

(72) Inventors: Lawrence Robert Carpenter, Darlington, SC (US); Kurt Ziegenfelder, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 148 days.

(21) Appl. No.: 14/631,134

(22) Filed: Feb. 25, 2015

(65) Prior Publication Data

US 2016/0244218 A1    Aug. 25, 2016

(51) Int. Cl.
| B65D 47/06 | (2006.01) |
| G01F 11/00 | (2006.01) |
| B65D 83/06 | (2006.01) |
| B65D 47/04 | (2006.01) |

(52) U.S. Cl.
CPC .......... *G01F 11/003* (2013.01); *B65D 47/046* (2013.01); *B65D 83/06* (2013.01)

(58) Field of Classification Search
CPC ........ G01F 11/003; G01F 11/22; G01F 11/26; G01F 11/261; B65D 47/046; B65D 83/06; B65D 5/744; B65D 5/76
See application file for complete search history.

(56) References Cited

U.S. PATENT DOCUMENTS

| 1,710,119 | A | * | 4/1929 | Smith | G01F 11/12 222/156 |
| 1,962,284 | A | * | 6/1934 | Punte | G01F 11/12 220/566 |
| 1,967,448 | A | * | 7/1934 | Olson | G01F 11/12 222/364 |
| 2,019,406 | A | * | 10/1935 | Garfein | G01F 11/261 222/364 |
| 2,026,681 | A | * | 1/1936 | Janssens | G01F 11/12 222/275 |
| 2,063,605 | A | * | 12/1936 | Janssens | G01F 11/12 222/284 |
| 2,102,772 | A | * | 12/1937 | Watts | G01F 11/003 222/364 |
| 2,943,769 | A | * | 7/1960 | Klausmann | B65D 5/76 222/364 |

(Continued)

FOREIGN PATENT DOCUMENTS

WO    2011104701 A1    9/2011

*Primary Examiner* — Nicholas J Weiss
(74) *Attorney, Agent, or Firm* — Miller, Matthias & Hull LLP

(57) ABSTRACT

A container and overcap assembly includes an open mouth container and an overcap with a built-in spout that is hinged to the overcap. The spout snaps shut inside the overcap when in a fully closed position and snaps into a fully open position as well. The spout accommodates a metered dose of product. In the fully open position, the spout seals the opening in the overcap to prevent product from exiting the container while a metered dose is dispensed from the open spout. The container assembly is particularly useful for containing and providing metered dispenses of dry products such as powders and granulated materials.

18 Claims, 4 Drawing Sheets

(56) References Cited

U.S. PATENT DOCUMENTS

| | | | |
|---|---|---|---|
| 3,921,862 A * | 11/1975 | Holmstrom | G01F 11/261 |
| | | | 222/305 |
| 4,298,038 A | 11/1981 | Jennings | |
| 5,667,106 A * | 9/1997 | Robbins, III | G01F 11/261 |
| | | | 222/158 |
| 5,791,528 A * | 8/1998 | Robbins, III | B65D 5/744 |
| | | | 222/364 |
| 5,850,944 A | 12/1998 | Robbins et al. | |
| 5,988,447 A * | 11/1999 | Yaski | B65D 5/744 |
| | | | 222/158 |
| 6,158,197 A | 12/2000 | Mogard et al. | |
| 6,536,627 B1 | 3/2003 | Benoit-Gonin et al. | |
| 7,445,169 B2 | 11/2008 | Young et al. | |
| 8,757,428 B2 | 6/2014 | Daudelin | |
| 8,813,982 B2 | 8/2014 | Van Geel et al. | |
| 2006/0102651 A1 * | 5/2006 | Archeny | B65D 47/046 |
| | | | 222/1 |
| 2011/0284589 A1 | 11/2011 | Serrano | |

\* cited by examiner

CONTAINER AND OVERCAP WITH HINGED SPOUT FOR METERED DISPENSING

BACKGROUND

Technical Field

This document discloses an overcap with a hinged spout capable of dispensing a metered amount of granular or powdered product.

Description of the Related Art

Dispensing containers are well known and have many different uses. One such use is in the food industry, and specific examples include jars and other similar containers, which contain solid foods (such as spices) in a particulate, granular or powder-like form. Many containers for such powdered and granular materials include a measuring scoop for dispensing a specific amount of powder. A user wishing to dispense a predetermined amount of powder from such a container must grope for the scoop within the powder, while often soiling his or her hands and the tabletop or work surface. Further, the user's hands make contact with the powder and therefore expose the powder to any germs or bacteria located on the user's hands.

U.S. Pat. No. 5,840,944 eliminates the need for measuring spoons, scoops or cups by providing a hollow cap, equipped with its own measuring device. However, while the structures disclosed in the '944 patent provide a built-in means for dispensing predetermined amounts of a powder, the structures of the caps and containers of the '944 patent are complex, difficult to manufacture and cumbersome to use. Hence, a need still exists for an improved and simplified structure for providing a container and/or cap equipped with an integral means for dispensing metered amounts of powdered or granular product from the container.

SUMMARY OF THE DISCLOSURE

In one aspect, this document discloses an overcap and spout assembly for a container that is capable of dispensing a metered amount of product from the container. The overcap and spout assembly includes an overcap that may include a sidewall connected to a top panel. The sidewall may include an opening that matably receives a spout. The sidewall may further include an exterior surface and an interior surface. The opening in the sidewall may include a first end and a second end. The spout may include an interior wall connected to an arcuate exterior wall at a corner that is hingedly connected to the overcap at the first end of the opening. The interior wall and arcuate exterior wall extend away from each other as they extend away from the corner. The arcuate exterior wall may include a top edge, a bottom edge and a distal edge disposed opposite the arcuate exterior wall from the corner. The spout may further include a top wall and a bottom wall. The top wall may connect the top edge of the arcuate exterior wall to the interior wall and the bottom wall may connect the bottom edge of the arcuate exterior wall to the interior wall. The top wall may include a distal edge disposed opposite the top wall from the corner and the bottom wall may include a distal edge disposed opposite the bottom wall from the corner. The distal edges of the arcuate exterior wall, the top wall and the bottom wall form a spout opening with the interior wall.

In another aspect, this patent document discloses a container assembly for containing and dispensing a metered amount of a powder. The container assembly may include an overcap including a sidewall connected to a top panel. The sidewall may include an opening that matably receives a spout. The sidewall may further include an exterior surface and an interior surface. The opening may include a first end and a second end. The sidewall may terminate at a skirt. The skirt may connect to an open mouth of a container. The spout may include an arcuate interior wall connect to an arcuate exterior wall at a corner that is hingedly connected to the overcap at the first end of the opening. The arcuate interior wall and the arcuate exterior wall may extend away from each other as they extend away from the corner. The arcuate exterior wall may include a top edge, a bottom edge and a distal edge disposed opposite the arcuate exterior wall from the corner. The spout may further include a top wall and a bottom wall. The top wall may connect the top edge of the arcuate exterior wall to the arcuate interior wall and the bottom wall may connect the bottom edge of the arcuate exterior wall to the arcuate interior wall. The top wall may include a distal edge disposed opposite the top wall from the corner and the bottom wall may include a distal edge disposed opposite the bottom wall from the corner. The distal edges of the arcuate exterior wall, top wall and bottom wall may form a spout opening with the arcuate interior wall. The distal end of the arcuate interior wall may engage the interior surface of the sidewall when the spout is pivoted to an open position.

In yet another aspect, a method for dispensing a metered dose of a product is disclosed. The method includes providing a container assembly that may include an overcap, a spout and a container. The overcap may include a sidewall connected to a top panel. The sidewall may include an opening that receives the spout. The sidewall may include an exterior surface and an interior surface. The opening may include a first end and a second end. The sidewall may terminate at a skirt that is connected to the container. The spout may include an interior wall connected to an arcuate exterior wall at a corner that is hingedly connected to the overcap at the first end of the opening. The interior wall and arcuate exterior wall may extend away from each other as they extend away from the corner. The arcuate exterior wall may include a top edge, a bottom edge and a distal edge disposed opposite the arcuate exterior wall from the corner. The spout may further include a top wall and a bottom wall. The top wall may connect the top edge of the arcuate exterior wall to the interior wall and the bottom wall may connect the bottom edge of the arcuate exterior wall to the interior wall. The top wall may include a distal edge disposed opposite the top wall from the corner. The bottom wall may include a distal edge disposed opposite the bottom wall from the corner. The distal edges of the arcuate exterior wall, top wall and bottom wall may form a spout opening with the interior wall. The distal end of the interior wall may engage the interior surface of the sidewall when the spout pivots to an open position. The method may further include pivoting the spout to a closed position where the distal edge of the arcuate exterior wall engages the sidewall at the second end of the opening, moving the container assembly to place a central axis of the container and overcap in a horizontal orientation, shaking the container assembly to fill the spout with powder, pivoting the spout to the open position and dispensing product from the spout.

In any one or more of the embodiments described above, the sidewall may be cylindrical with a central axis and a radius that defines a curvature of the sidewall. The arcuate exterior wall of the spout also may also have a curvature defined by the radius of the sidewall.

In any one or more of the embodiments described above, the interior wall is also arcuate and in a further refinement, the interior wall may have a curvature defined by the radius of the sidewall.

In any one or more of the embodiments described above, the distal end of the interior wall engages the interior surface of the sidewall when the spout pivots to an open position.

In any one or more of the embodiments described above, the exterior surface of the sidewall includes a detent disposed adjacent to the second end of the opening with a transverse rib disposed between the detent and the second end of the opening. Further, the distal edge of the arcuate exterior wall may include a latch that receives the transverse rib when the spout pivots to a closed position. In such an embodiment, the distal end of the interior wall may include a pair of spaced-apart legs and the detent may be disposed between the spaced-apart legs when the spout pivots to an open position.

In any one or more of the embodiments described above, the corner may be hingedly connected to the sidewall with a living hinge.

In any one or more of the embodiments described above, the corner may be welded to the sidewall.

In any one or more the embodiments described above, the corner, top wall, bottom wall and arcuate exterior wall and a portion of the interior wall that is connected to the top and bottom walls define a chamber for dispensing a metered amount dry material.

In any one or more of the embodiments described above, the top wall of the spout abuttingly engages an underside of the top panel of the overcap.

The features, functions, and advantages discussed above may be achieved independently in various embodiments or may be combined in yet other embodiments, further details of which can be seen with reference to the following description and drawings.

BRIEF DESCRIPTION OF THE DRAWINGS

For a more complete understanding of the disclosed methods and apparatuses, reference should be made to the embodiments illustrated in greater detail in the accompanying drawings, wherein.

The drawings are not necessarily to scale and illustrate the disclosed embodiments diagrammatically and in partial views. In certain instances, this disclosure may omit details which are not necessary for an understanding of the disclosed methods and apparatuses or which render other details difficult to perceive. Further, this disclosure is not limited to the particular embodiments illustrated herein.

DETAILED DESCRIPTION OF THE PRESENTLY PREFERRED EMBODIMENTS

Figure 1:
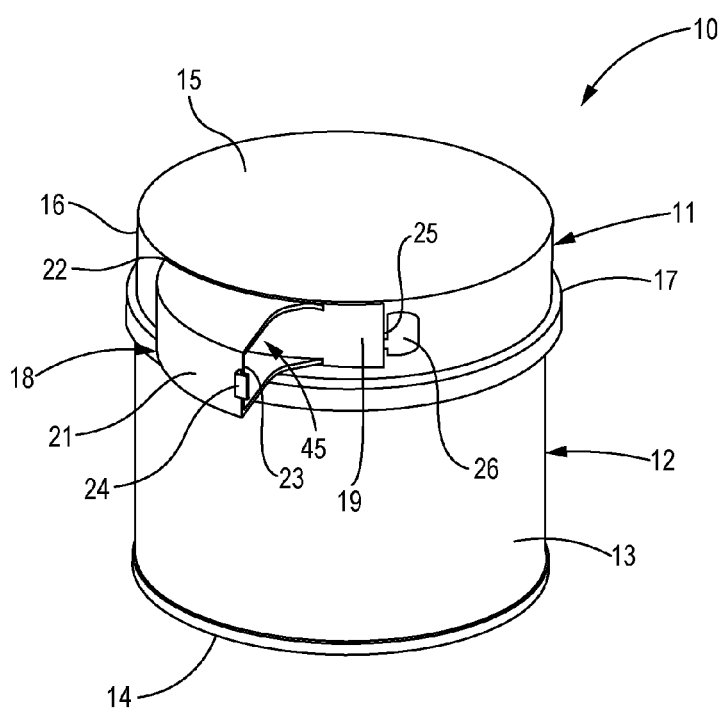
FIG. 1 is a perspective view of a disclosed container and overcap assembly.

FIG. 1 illustrates a container and overcap assembly 10 made in accordance with this disclosure. The assembly 10 includes an overcap 11 that receives an open mouth of a container 12. The container 12 may include a sidewall 13 that extends between the overcap 11 and a bottom panel 14. The overcap 11 may include a top panel 15 that may connect at its outer periphery to a sidewall 16. The sidewall 16 extends from the top panel 15 to a skirt 17 that receives an open mouth (not shown) of the container 12. As shown in FIG. 1 the overcap 11 may connect to a spout 18. The spout 18 may include an interior wall 19 and an arcuate exterior wall 21 that may connect to the interior wall 19 at a corner 22. The corner 22 may pivotally connect to the overcap 11 and, in FIG. 1, the spout 18 has been pivoted to a fully-open position. In contrast, in FIG. 2, the spout 18 has been pivoted to a fully closed position. Further, the arcuate exterior wall 21 includes a distal edge 23 that may include or as otherwise may connect to a latch 24. The latch 24 may snap onto a transverse rib 25 disposed on the sidewall 16. Further, the transverse rib 25 may be disposed adjacent to a detent 26 formed in the sidewall 16 of the overcap 11. The detent 26 provides a space for a user's finger to obtain a grip or purchase on the latch 24 to facilitate moving the spout 18 from the closed position shown in FIG. 2 to the open position shown in FIG. 1.

Figure 2:
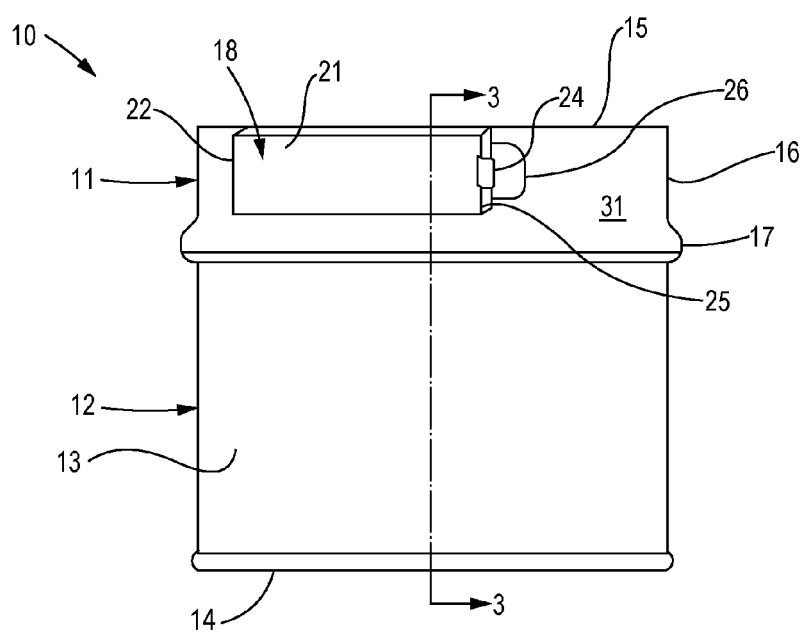
FIG. 2 is a front plan view of the assembly shown in FIG. 1.
Figure 3:
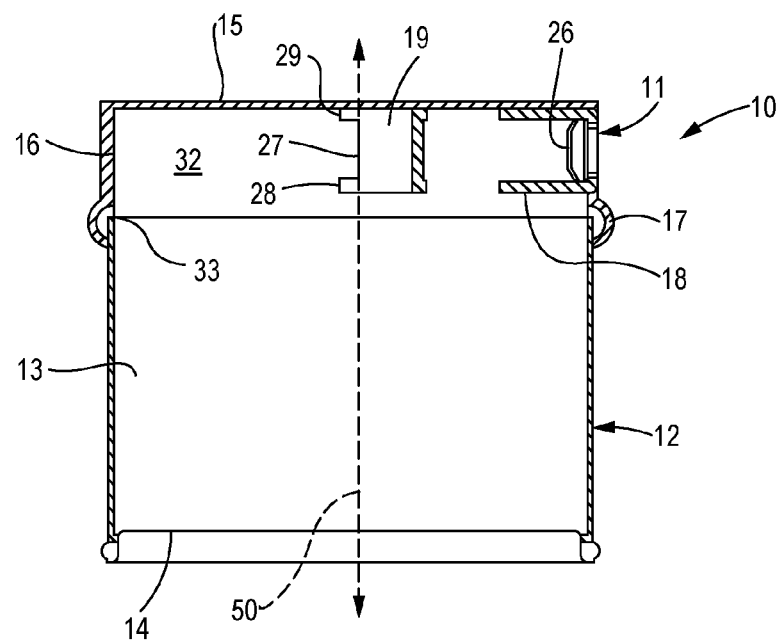
FIG. 3 is a sectional view taken substantially along line 3-3 of FIG. 2.
Figure 5:
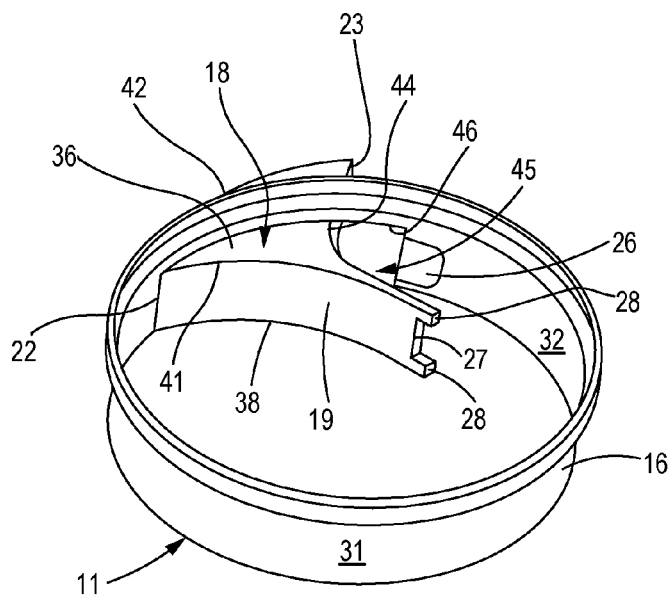
FIG. 5 is a bottom perspective view of the overcap and spout of the assembly illustrated in FIGS. 1-3.

Thus, in FIG. 2, the spout 18 has been moved to the fully closed position and the latch 24 has engaged the rib 25 to snap the spout 18 into the closed position. The spout 18 may also feature a function to snap the spout 18 into the fully open position shown in FIG. 1. Specifically, turning to the sectional view of FIG. 3 and the perspective view of FIG. 6, the interior wall 19 terminates at a distal end 27. The distal end 27 may feature a pair of spaced-apart legs 28, 29. Further, while the detent 26 provides an indentation in the exterior surface 31 of the sidewall 16, the detent 26 forms a protrusion in the interior surface 32 of the sidewall 16 as shown in FIGS. 3 and 5. When pivoted to the fully open position shown in FIG. 1, the legs 28, 29 straddle the detent 26 (which forms an indentation in the interior surface 32 of the sidewall 16) thereby frictionally receiving the detent 26 between the legs 28, 29 and snapping the spout 18 into the open position shown in FIG. 1.

Figure 4:
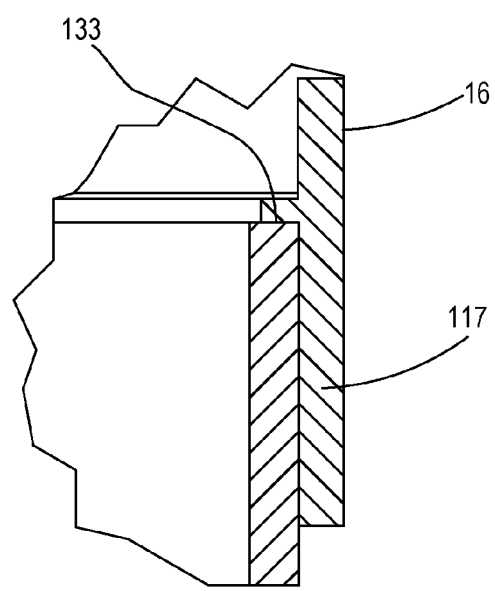
FIG. 4 is an enlarged partial view of an alternative embodiment of a skirt of the overcap receiving an open mouth of the container.

FIG. 3 also illustrates the engagement between the skirt 17 and the open mouth or upper rim 33 of the container 12. As shown in FIG. 3, the skirt 17 frictionally receives the upper rim 33 to provide a snap fit. However, as shown in FIG. 4, a skirt 117 may be provided that is essentially a vertical extension of the sidewall 16 that mateably receives a cylindrical upper rim 133. The skirt 117 may be connected to the upper rim 133 using an adhesive or complimentary threads on the skirt 117 and the upper rim 133. Other means for securing the overcap 11 to the container 12 are numerous and will be apparent to those skilled in the art.

Figure 6:
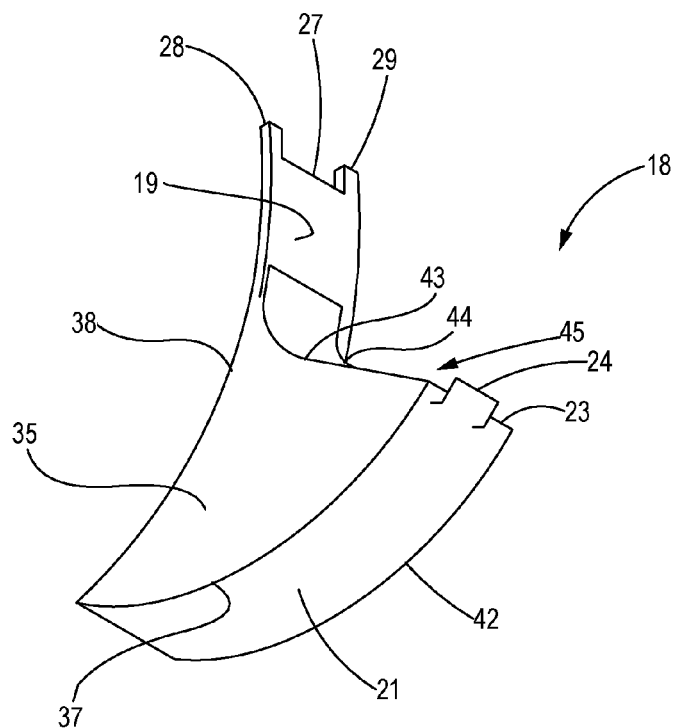
FIG. 6 is a perspective view of the spout illustrated in FIGS. 1-3 and 5.

Turning to FIGS. 5-6, in addition to the interior wall 19 and arcuate exterior wall 21, the spout 18 may also include a bottom wall 35 and a top wall 36. In the embodiment shown, the bottom wall 35 connects a bottom edge 37 of the arcuate exterior wall 21 to a bottom edge 38 of the interior wall 19 as shown in FIG. 6. Further, as shown in FIG. 5, the top wall 36 connects a top edge 42 of the arcuate exterior wall 21 to a top edge 41 of the interior wall 19 (see also FIG. 6). However, it will be noted that the interior wall 19 may not have defined bottom and top edges 38, 41 and that the interior wall 19, top wall 36 and bottom wall 35 may form a continuous curved structure that connects to the arcuate exterior wall 21 to form the spout 18. Further, the bottom wall 35 may include a distal edge 43 (FIG. 6) and the top wall 36 may also include a distal edge 44 (FIG. 5). In the embodiment shown, the distal edge 43 of the bottom wall 35, the distal edge 23 of the arcuate exterior wall 21 and the distal edge 44 of the top wall 36 cooperate with a portion of the interior wall 19 that extends beyond the bottom and top walls 35, 36 to form a spout opening 45 for receiving and dispensing a metered amount of powder. The distal end 27 of the interior wall 19 extends beyond the opening 46 (FIGS. 3, 5 and 7) to close the opening 46 and prevent product held in the container 12 from leaking though the opening 46 when the spout 18 was been moved to the fully open position of FIG. 1.

The interior wall 19 may be arcuate, as shown in FIGS. 1-6. Further, the arcuate exterior wall 21 may have the same curvature or a curvature defined by the same radius as the sidewall 16 to ensure that the arcuate exterior wall 21 is flush with the sidewall 16 when the spout 18 is pivoted to the closed position of FIG. 2. If the interior wall 19 is curved or arcuate, it may also have a curvature defined by the radius of the sidewall 16.

INDUSTRIAL APPLICABILITY

Figure 7:
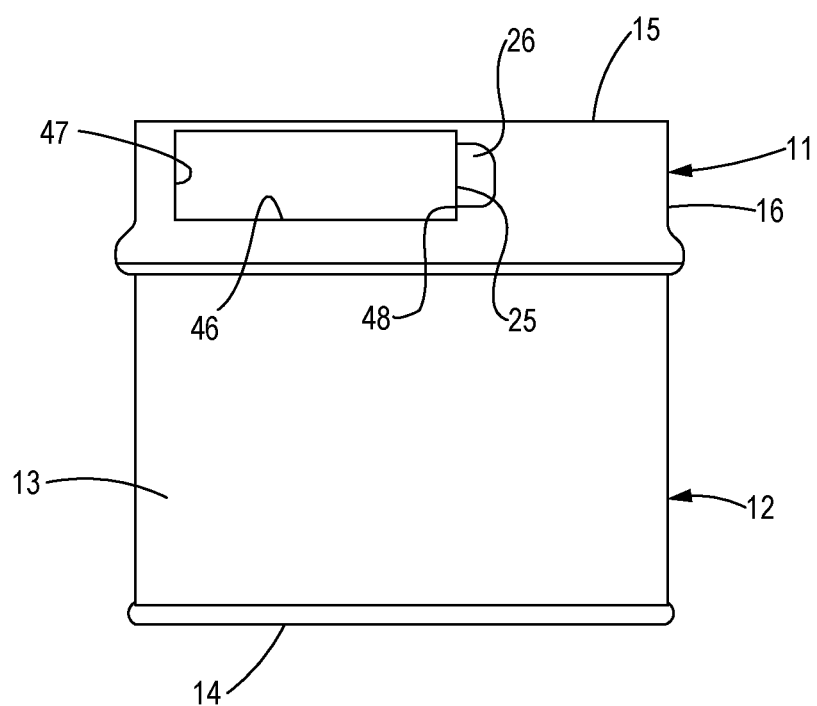
FIG. 7 is a front plan view of the container and overcap with the spout removed.

The disclosed assembly 10 provides a versatile package for containing a powder, such as lemonade mix, hot cocoa mix, spices, nutritional supplements and other powders or granular food products. The overcap 11 can be transparent, thereby permitting the user to view the product disposed in the container 12, or the overcap 11 may be opaque. Further, the overcap 11 and container 12 need not be cylindrical, and may include non-cylindrical or non-round shapes. The spout 18 may be designed to accommodate a metered dose of the powder (or granules, particles, etc.) contained within the assembly 10. The spout 18 may include a latch 24 that may also serve as a pull-tab to facilitate moving the spout 18 from the closed position shown in FIG. 2 to the open position shown in FIG. 1. In addition to facilitating a user's ability to grip the spout 18 during opening and closing, the latch 24 may also snap onto the transverse rib 25 to maintain the spout 18 in the fully closed position shown in FIG. 2. The corner 22 of the spout 18 may hingedly connect to the sidewall 16 of the overcap 11. Such a hinged connection may be provided by applying a thin plastic layer to the corner 22 and either the exterior surface 31 or interior surface 32 of the sidewall 16 of the overcap 11. The corner 22 of the spout 18 may also be welded to the sidewall 16 of the overcap 11. Further, the spout 18 and overcap 11 may be molded as a single piece. In addition to a possible snap-fit around the detent 26, the legs 28, 29 disposed at the distal end 27 of the interior wall 19 also prevent the interior wall 19 of the spout 18 from being pulled through the opening 46 disposed in the sidewall 16 of the overcap 11 as shown in FIG. 7. Further, the opening 46 includes a first end 47, which connects to the corner 22 of the spout 18, and a second end 48, which includes the transverse rib 25 that is received by the latch 24 when the spout 18 is moved to the closed position shown in FIG. 2.

A metered dose of product may be easily dispensed form the assembly 10 in the following manner. First, with the spout 18 in the fully closed position as shown in FIG. 2, the assembly 10 is tilted until its central axis 50 (FIG. 3) is in a horizontal orientation with the second end 48 of the opening 46 disposed above the first end 47 of the opening 46 (or the rib 25 and detent 26 are disposed above the corner 22). Holding the assembly 10 with the second end 48 of the opening 46 disposed above the first end 47 of the opening 46 ensures that the spout opening 45 faces upwards and is ready to receive powder. Then, the user shakes the assembly 10 to fill the spout 18 full of powder. Then, while maintaining the assembly 10 in the horizontal orientation with the rib 25 and detent 26 disposed above the corner 22, the spout 18 may be pivoted to the fully open position and the product may be dispensed by rotating the assembly 10 about its central axis 50. Maintaining the assembly 10 in the horizontal orientation with the detent 26 disposed above the corner 22 when the spout 18 is opened ensures that the metered dose of product stays within the spout 18 and does not spill out prior to the dispense.

While only certain embodiments of been set forth, alternative embodiments and various modifications will be apparent from the above description to those skilled in the art. These and other alternatives are considered equivalents and within the spirit and scope of the present disclosure.

What is claimed:

1. An overcap and spout assembly for a container for dispensing a metered amount of product from the container, the overcap and spout assembly comprising:
   an overcap including a sidewall connected to a top panel, the sidewall defining an opening that mateably receives a spout, the sidewall including an exterior surface and an interior surface, the opening including a first end and a second end,
   the spout including an interior wall connected to an arcuate exterior wall at a corner that is hingedly connected to the first end of the opening, the interior wall and arcuate exterior wall extending away from each other as they extend away from the corner, the interior wall including a distal end opposite the corner, the arcuate exterior wall including a top edge, a bottom edge and a distal edge opposite the corner,
   the spout further including a top wall and a bottom wall, the top wall connecting the interior wall to the top edge of the arcuate exterior wall and the bottom wall connecting the interior wall to the bottom edge of the arcuate exterior wall, the top wall including a distal edge disposed opposite the top wall from the corner, the bottom wall including a distal edge disposed opposite the bottom wall from the corner,
   the distal edges of the arcuate exterior wall, the top wall and the bottom wall forming a spout opening with the interior wall,
   wherein the exterior surface of the sidewall includes a detent disposed adjacent to the second end of the opening with a transverse rib disposed between the detent and the second end of the opening, and
   the distal edge of the arcuate exterior wall including a latch that receives the transverse rib when the spout pivots to a closed position.

2. The assembly of claim 1 wherein the sidewall is cylindrical with a central axis and a radius that defines a curvature of the sidewall, the arcuate exterior wall of the spout also having a curvature that is defined by the radius of the sidewall.

3. The assembly of claim 1 wherein the distal end of the interior wall engages the interior surface of the sidewall when the spout is pivoted to an open position.

4. The assembly of claim 1 wherein the distal end of the interior wall includes a pair of spaced-apart legs, the detent being disposed between the spaced-apart legs when the spout pivots to an open position.

5. The assembly of claim 1 wherein the corner is hingedly connected to the sidewall with a living hinge.

6. The assembly of claim 1 wherein the corner is welded to the sidewall.

7. The assembly of claim 1 wherein the corner, top wall, bottom wall, arcuate exterior wall and a portion of the interior wall that is connected to the top and bottom walls define a chamber of a predetermined volume for dispensing a metered amount of powder.

8. The assembly of claim 1 wherein the interior wall is arcuate and has a curvature that is defined by a radius of the sidewall.

9. A container assembly for containing and dispensing a metered amount of a powder, the container assembly comprising:
   an overcap including a sidewall connected to a top panel, the sidewall including an opening that mateably receives a spout, the sidewall including an exterior surface and an interior surface, the opening including a first end and a second end,
   the sidewall terminating at a skirt, the skirt connecting to an open mouth of a container,
   the spout including an arcuate interior wall connected to an arcuate exterior wall at a corner that is hingedly connected to the first end of the opening, the arcuate interior wall and arcuate exterior wall extending away from each other as they extend away from the corner, the arcuate exterior wall including a top edge, a bottom edge and a distal edge disposed opposite the corner,
   the spout further including a top wall and a bottom wall, the top wall connecting the arcuate interior wall to the top edge of the arcuate exterior wall and the bottom wall connecting the arcuate interior wall to the bottom edge of the arcuate exterior wall, the top wall including a distal edge disposed opposite the corner, the bottom wall including a distal edge disposed opposite the corner,
   the distal edges of the arcuate exterior wall, top wall and bottom wall forming a spout opening with the arcuate interior wall, the distal end of the arcuate interior wall engaging the interior surface of the sidewall when the spout pivots to an open position,
   wherein the exterior surface of the sidewall includes a detent disposed adjacent to the second end of the opening with a transverse rib disposed between the detent and the second end of the opening, and
   the distal edge of the arcuate exterior wall including a latch that received the transverse rib when the spout pivots to a closed position.

10. The assembly of claim 9 wherein the sidewall is cylindrical with a central axis and a radius that defines the curvature of the sidewall, the arcuate interior wall and arcuate exterior wall of the spout also having curvatures that are defined by the radius of the sidewall.

11. The assembly of claim 9 wherein the distal end of the arcuate interior wall includes a pair of spaced-apart legs, the detent being disposed between the spaced-apart legs when the spout is pivoted to an open position.

12. The assembly of claim 9 wherein the corner is hingedly connected to the sidewall with a living hinge.

13. The assembly of claim 9 wherein the corner is welded to the sidewall.

14. The assembly of claim 9 wherein the skirt is glued to the open mouth of the container.

15. The assembly of claim 9 wherein the skirt is snap-fitted onto the open mouth of the container.

16. A method for dispensing a metered dose of a pourable product, the method comprising:
   providing a container assembly including an overcap, a spout and a container, the overcap including a sidewall connected to a top panel, the sidewall including an opening that mateably receives the spout, the sidewall including an exterior surface and an interior surface, the opening including a first end and a second end, the sidewall terminating at a skirt connected to the container, the spout including an interior wall connected to an arcuate exterior wall at a corner that is hingedly connected to the overcap at the first end of the opening, the interior wall and arcuate exterior wall extending away from each other as they extend away from the corner, the arcuate exterior wall including a top edge, a bottom edge and a distal edge disposed opposite the corner, the spout further including a top wall and a bottom wall, the top wall connecting the interior wall to the top edge of the arcuate exterior wall and the bottom wall connecting the interior wall to the bottom edge of the arcuate exterior wall, the top wall including a distal edge disposed opposite the corner, the bottom wall including a distal edge disposed opposite the corner, the distal edges of the arcuate exterior wall, top wall and bottom wall forming a spout opening with the interior wall, wherein the exterior surface of the sidewall includes a detent disposed adjacent to the second end of the opening with a transverse rib disposed between the detent and the second end of the opening, and the distal edge of the arcuate exterior wall including a latch that receives the transverse rib when the spout pivots to a closed position,
   pivoting the spout to a closed position where the distal edge of the arcuate exterior wall engages the sidewall at the second end of the opening so the latch receives the transverse rib,
   moving the container assembly to place a central axis of the container and overcap in a horizontal orientation,
   shaking the container assembly to fill the spout with powder,
   pivoting the spout to the open position, and
   dispensing product from the spout.

17. The method of claim 16 wherein the moving of the container assembly to place the central axis of the container and overcap in a horizontal position step further includes moving of the container assembly to place the central axis of the container and overcap in a horizontal position and the spout opening in an upward-facing position.

18. The method of claim 16 wherein the moving of the container assembly to place the central axis of the container and overcap in a horizontal position step further includes moving of the container assembly to place the central axis of the container and overcap in a horizontal position with the second end of the opening in the sidewall disposed above the first end of the opening in the sidewall.

* * * * *